(12) United States Patent
Toyoda

(10) Patent No.: US 9,392,237 B2
(45) Date of Patent: Jul. 12, 2016

(54) IMAGE PROCESSING DEVICE AND IMAGE PROCESSING METHOD

(71) Applicant: Olympus Corporation, Shibuya-ku, Tokyo (JP)

(72) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 20 days.

(21) Appl. No.: 14/279,636

(22) Filed: May 16, 2014

(65) Prior Publication Data
US 2014/0347533 A1    Nov. 27, 2014

(30) Foreign Application Priority Data
May 21, 2013    (JP) ................................. 2013-107069

(51) Int. Cl.
H04N 5/359    (2011.01)
H04N 9/04     (2006.01)
H04N 5/232    (2006.01)

(52) U.S. Cl.
CPC ........... *H04N 9/045* (2013.01); *H04N 5/23212* (2013.01); *H04N 5/359* (2013.01)

(58) Field of Classification Search
CPC ..... H04N 5/23212; H04N 5/045; H04N 9/11; H04N 5/3696; H04N 5/359; H04N 9/646; H04N 9/1917; H04N 9/045; G02B 7/28; G02B 7/34; G02B 7/36
USPC .......................... 348/294, 345, 349, 308, 350
See application file for complete search history.

(56) References Cited

U.S. PATENT DOCUMENTS

| 6,781,632 | B1* | 8/2004 | Ide ................................. 348/345 |
| 7,655,893 | B2* | 2/2010 | Campbell ......... H01L 27/14627 250/208.1 |
| 7,876,363 | B2* | 1/2011 | Ovsiannikov .......... H04N 9/045 348/223.1 |
| 8,094,232 | B2  | 1/2012 | Kusaka |
| 8,446,501 | B2* | 5/2013 | Nakagawa .................... 348/294 |
| 8,767,100 | B2* | 7/2014 | Chen .................... H04N 5/3572 348/187 |
| 8,786,708 | B2* | 7/2014 | Vaillant et al. ................. 348/187 |
| 8,902,330 | B2* | 12/2014 | Theuwissen ......... H04N 5/2173 348/222.1 |
| 2006/0291706 | A1* | 12/2006 | Gunstream et al. ........... 382/128 |
| 2007/0206242 | A1* | 9/2007 | Smith ............................ 358/505 |

(Continued)

OTHER PUBLICATIONS

G. Agranov et al. "Crosstalk and Microlens Study in a Color CMOS Image Sensor"—IEEE Transaction on Electron Devices, vol. 50, No. 1, pp. 4-11 (2003).*

(Continued)

*Primary Examiner* — Tuan Ho
*Assistant Examiner* — Marly Camargo
(74) *Attorney, Agent, or Firm* — John C. Pokotylo; Straub & Pokotylo

(57) ABSTRACT

An image processing device of the present invention comprises an image sensor having phase difference detection pixels for focus detection arranged at positions of some imaging pixels, a crosstalk effect level estimating section for estimating crosstalk effect level for respective pixel values, from pixel values of pixels that are subject to the effects of crosstalk from the phase difference detection pixels, and pixel values of nearby pixels that are not subject to the effect of crosstalk from the phase difference detection pixels, and a correction processing section for correcting pixel values of pixels that have been affected by crosstalk from the phase difference detection pixels based on the crosstalk effect level that has been estimated by the crosstalk effect level estimating section.

6 Claims, 8 Drawing Sheets

(56) References Cited

U.S. PATENT DOCUMENTS

| | | | |
|---|---|---|---|
| 2009/0128671 A1* | 5/2009 | Kusaka | 348/246 |
| 2010/0091161 A1* | 4/2010 | Suzuki | H01L 27/14609 348/302 |
| 2011/0031418 A1* | 2/2011 | Shcherback et al. | 250/559.29 |
| 2012/0092520 A1* | 4/2012 | Proca | H04N 9/69 348/223.1 |
| 2012/0206635 A1* | 8/2012 | Kikuchi et al. | 348/308 |
| 2013/0155271 A1* | 6/2013 | Ishii | 348/222.1 |
| 2014/0078349 A1* | 3/2014 | Velichko et al. | 348/241 |
| 2014/0285701 A1* | 9/2014 | Takakusagi | 348/336 |
| 2015/0146052 A1* | 5/2015 | Sawadaishi et al. | 348/266 |

OTHER PUBLICATIONS

B. McCleary, "Cross-talk correction methodology for color CMOS imagers"—SPIE Proc. of SPIE-IS&T Electronic Imaging, vol. 5678, pp. 117-128 (2005).*

* cited by examiner

FIG. 4

|    | x1 | x2 | x3 | x4 | x5 | x6 | x7 | x8 | x9 | x10 | x11 | x12 | x13 |
|----|----|----|----|----|----|----|----|----|----|-----|-----|-----|-----|
| y1 | Gb | B  | Gb | B  | Gb | B  | Gb | B  | Gb | B   | Gb  | B   | Gb  |
| y2 | R  | Gr | *R* | Gr | R  | Gr | *R* | Gr | R  | Gr  | *R* | Gr  | R   |
| y3 | Gb | B | *Gb* | B | Gb | B | *Gb* | B | Gb | B | *Gb* | B | Gb  |
| y4 | R  | Gr | R  | Gr | R  | Gr | R  | Gr | R  | Gr  | R   | Gr  | R   |
| y5 | Gb | B  | Gb | B  | Gb | B  | Gb | B  | Gb | B   | Gb  | B   | Gb  |
| y6 | R  | Gr | *R* | Gr | R  | Gr | *R* | Gr | R  | Gr  | *R* | Gr  | R   |
| y7 | Gb | B | *Gb* | B | Gb | B | *Gb* | B | Gb | B | *Gb* | B | Gb  |
| y8 | R  | Gr | R  | Gr | R  | Gr | R  | Gr | R  | Gr  | R   | Gr  | R   |
| y9 | Gb | B  | Gb | B  | Gb | B  | Gb | B  | Gb | B   | Gb  | B   | Gb  |
| y10 | R | Gr | *R* | Gr | R  | Gr | *R* | Gr | R  | Gr  | *R* | Gr  | R   |
| y11 | Gb | B | *Gb* | B | Gb | B | *Gb* | B | Gb | B | *Gb* | B | Gb |
| y12 | R | Gr | R  | Gr | R  | Gr | R  | Gr | R  | Gr  | R   | Gr  | R   |
| y13 | Gb | B  | Gb | B  | Gb | B  | Gb | B  | Gb | B   | Gb  | B   | Gb  |

*Gb*   PHASE DIFFERENCE PIXEL

R, B   PIXELS THAT HAVE BEEN AFFECTED BY CROSSTALK FROM PHASE DIFFERENCE PIXELS

IMAGE PROCESSING DEVICE AND IMAGE PROCESSING METHOD

Benefit is claimed, under 35 U.S.C. §119, to the filing date of prior Japanese Patent Application No. 2013-107069 filed on May 21, 2013. This application is expressly incorporated herein by reference. The scope of the present invention is not limited to any requirements of the specific embodiments described in the application.

BACKGROUND OF THE INVENTION

1. Field of the Invention

The present invention relates to an image processing device and an image processing method capable of reducing differences in color between regions where normal pixels are arranged and regions where phase difference pixels are arranged.

2. Description of the Related Art

Technology used in auto focus, where phase difference pixels for detecting phase difference are arranged on part of an image sensor, phase difference information is acquired from these phase difference pixels, and a defocus amount for an imaging optical system is calculated, is commonplace. On the other hand, as a general characteristic of an image sensor, a phenomenon where there is charge leakage to adjacent pixels (called crosstalk) is known. Charge amount of image sensor crosstalk is substantially proportional to the amount of incident light on the pixels, but phase difference pixels receive less incident light compared to normal pixels, and so crosstalk is less than that for normal pixels.

Therefore, when shooting subjects of the same color, the color will be different in regions where normal pixels are arranged and regions where phase difference pixels are arranged. In order to solve this problem, an imaging device has been proposed in which amount of crosstalk is estimated from phase difference pixels around a noted pixel (normal pixel), and correction is performed for the noted pixel value (refer to U.S. Pat. No. 8,094,232).

SUMMARY OF THE INVENTION

At the time of live view display or movie storage etc., in order to read image data from the image sensor at high speed it is common practice to additively combine a plurality of same color pixels of the image sensor. With this additive combination, the effects of crosstalk are propagated to pixels around the pixel that is affected by crosstalk, and it is difficult to estimate crosstalk amount from the surrounding pixels.

An object of the present invention is to provide an image processing device and an image processing method capable of reducing differences in color between regions where normal pixels are arranged and regions where phase difference pixels are arranged.

An image processing device of the present invention comprises an the image sensor having phase difference detection pixels for focus detection arranged at positions of some imaging pixels, a crosstalk effect level estimating section for estimating crosstalk effect level for respective pixel values, from pixel values of pixels that are subject to the effects of crosstalk from the phase difference detection pixels, and pixel values of nearby pixels that are not subject to the effect of crosstalk from the phase difference detection pixels, and a correction processing section for correcting pixel values of pixels that have been affected by crosstalk from the phase difference detection pixels based on the crosstalk effect level that has been estimated by the crosstalk effect level estimating section.

An image processing device of the present invention comprises an image sensor having phase difference detection pixels for focus detection arranged at positions of some imaging pixels, a first mixing section, arranged within a first region of the image sensor, for mixing pixel values of a plurality of same color pixels including pixels that have been affected by crosstalk from the phase difference detection pixels, a second mixing section, arranged within a second region of the image sensor, for mixing pixel values of a plurality of same color pixels that have not been affected by crosstalk from the phase difference detection pixels, a crosstalk effect level estimating section for estimating crosstalk effect level of mixed pixel values within the first region and mixed pixel values within the second region, from the respective mixed pixel values, and a correction processing section for correcting pixel values of pixels that have been affected by crosstalk from the phase difference detection pixels within the first region in accordance with the crosstalk effect level that has been estimated by the crosstalk effect level estimating section.

An image processing method of the present invention is an image processing method, for an image processing device having an image sensor with phase difference detection pixels for focus detection arranged at positions of some imaging pixels, comprising a step of estimating a crosstalk effect level for respective pixel values, from pixel values of pixels that are subject to the effects of crosstalk from the phase difference detection pixels, and pixel values of nearby pixels that are not subject to the effect of crosstalk from the phase difference detection pixels, and a step of correcting pixel values of pixels that have been affected by crosstalk from the phase difference detection pixels based on the estimated crosstalk effect level.

BRIEF DESCRIPTION OF THE DRAWINGS

FIG. 4 is a drawing showing an arrangement pattern for phase difference pixels and the effect of crosstalk on surrounding pixels, for an image sensor of the camera of the one embodiment of the resent invention.

FIG. 5A and FIG. 5B are drawings showing propagation of crosstalk at the time of pixel addition, for the image sensor of the one embodiment of the present invention.

FIG. 6 is a drawing showing regions for pixel addition data and crosstalk estimation, for the image sensor of the one embodiment of the present invention.

DETAILED DESCRIPTION OF THE PREFERRED EMBODIMENTS

Preferred embodiments using a camera to which the present invention has been applied will be described in the following in accordance with the drawings. The camera of one embodiment of the present invention is a digital camera, provided with an imaging section having an image sensor that comprises phase difference pixels for focus detection using a phase difference detection method in some of the image in pixels, with a subject image being converted to image data by this imaging section, and focusing of a photographing lens being performed by calculating defocus direction and defocus amount using a well-known phase difference detection method based on output from the phase difference pixels.

Also, live view display is carried out based on image data that has been generated by the images section, and still image shooting and movie shooting are carried out. At this time, crosstalk difference amount for respective pixel values is estimated from pixel values of pixels that have been affected by crosstalk from the phase difference pixels, and pixel values of nearby same color pixels that have not been affected by crosstalk from the phase difference pixels, and correction of pixel values of pixels that have been affected by crosstalk from phase difference pixels is carried out based on this estimated crosstalk difference value. Live view display and movie shooting etc. our carried out using this corrected pixel value.

Figure 1:
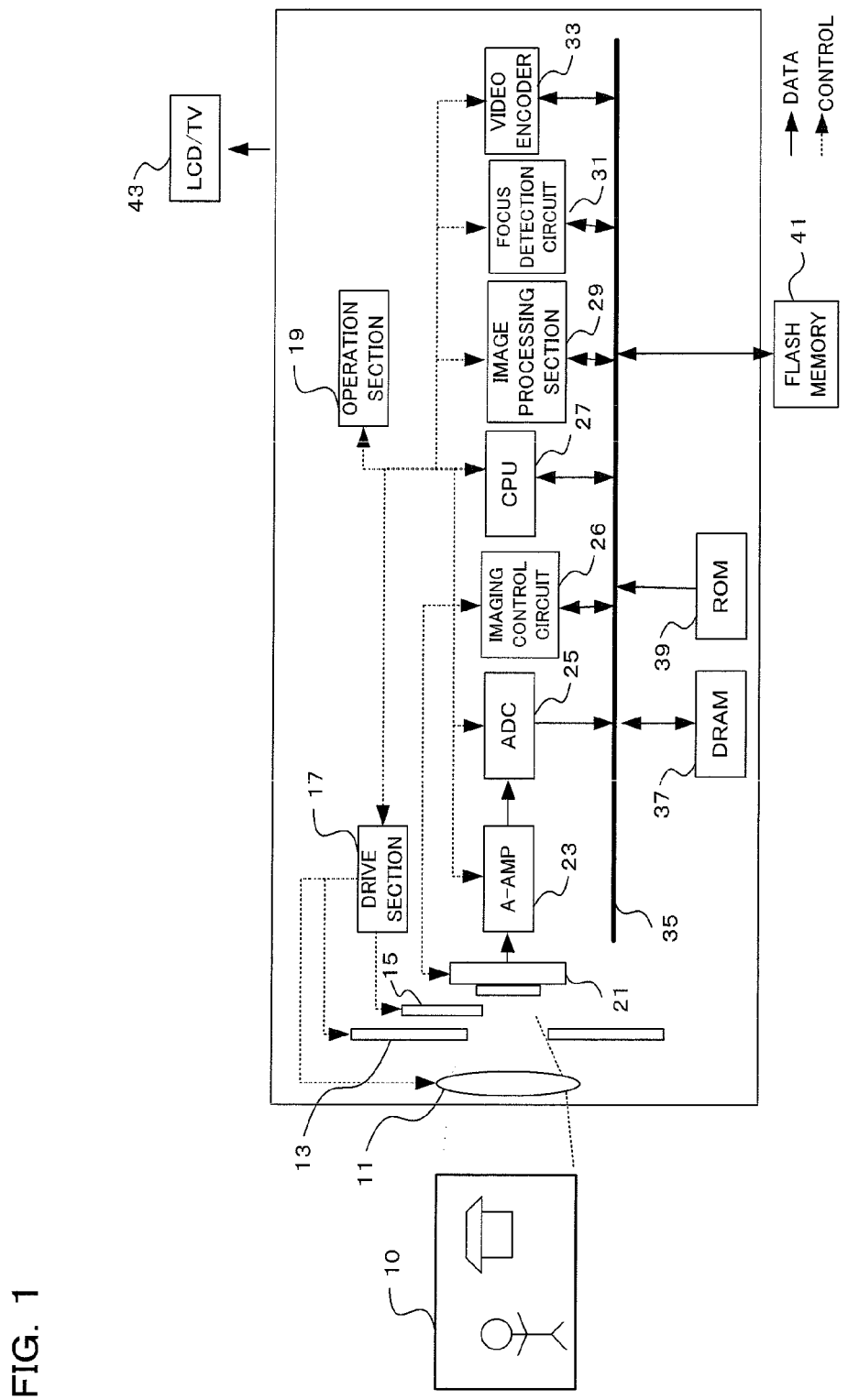
FIG. 1 is a block diagram mainly showing the electrical structure of a camera of one embodiment of the present invention.

FIG. 1 is a block diagram mainly showing the electrical structure of a camera of one embodiment of the present invention. In FIG. 1, solid lines with arrows represent flow of data, and dotted lines with arrows represent flow of control signals. Inside the camera are a photographing lens 11, aperture 13, mechanical shutter 15, drive section 17, operating section 19, image sensor 21, A-AMP 23, analog-to-digital converter (ADC) 25, imaging control circuit 26, CPU (central processing unit) 27, image processing section 29, focus detection circuit 31, video encoder 33, bus 35, DRAM (dynamic random access memory) 37, ROM (read-only memory) 39, and flash memory 41.

The photographing lens 11 is constituted by a plurality of optical lenses for forming a subject image, and is a fixed focal length lens or a zoom lens. The aperture 13 is arranged to the rear of this photographing lens 11 along the optical axis, and this aperture 13 has a variable opening diameter, to restrict the amount of subject light flux that passes through the photographing lens 11. The mechanical shutter 15 is arranged behind this aperture 13, and controls the amount of time for which subject light flux passes through the photographing lens. A well-known focal plane shutter or lens shutter etc. is adopted as the mechanical shutter 15.

The drive section 17 carries out focus adjustment of the photographing lens 11, opening diameter control of the aperture 13, and opening and closing control (shutter control) of the mechanical shutter 15, based on control signals from the CPU 27.

The operating section 19 includes operation members such as various input buttons, like a power supply button, release button, playback button, and menu button, and various input keys, and detects operating states of these operation members and outputs the result of detection to the CPU 27. It is possible to select still picture shooting mode and movie shooting mode with a shooting mode dial or menu screens etc. When movie shooting mode is selected, if the release button is operated movie shooting is commenced, and if the release button is pressed again movie shooting is stopped. As the shooting selection section, it is also possible to replace with a different method, such as providing a movie button on the operating section 19 and commencing movie shooting when the movie button is operated etc.

The image sensor 21 is arranged on the optical axis of the photographing lens 11, behind the mechanical shutter 15, and close to a position where a subject image is formed by the photographing lens 11. Phase difference pixels for focus detection are provided in the image sensor 21 at some of the pixels. The image sensor 21 also has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode.

A Bayer array color filter is arranged on an incident surface side of each pixel. A Bayer array has lines of R pixels and G pixels arranged alternately, and lines of G pixels and B pixels arranged alternately, in a horizontal direction. Some of the G pixels are replaced with phase difference pixels for focus detection. With this embodiment, a Bayer array is provided but the present invention is not thus limited. It is also possible to have a honeycomb array imaging device or color filters arranged with irregular periodicity. Also, the phase difference pixels are not limited to some of the G pixels, nor in terms of arrangement periodicity or arrangement number, type of color filter, or whether or not there is a color filter.

Also, when reading out signals from normal pixels or phase difference pixels, the image sensor 21 also functions as a mixing section for mixing and outputting pixel values for same color pixels within a specified area. With this embodiment, the function of a mixing section is fulfilled by the image sensor, but mixing of pixel values may also be performed by the ADC 25, which will be described later. The detailed structure of the image sensor 21 will be described later using FIG. 3 and FIG. 4. In this specification, as long as a signal is based on an analog image signal output from pixels of the image sensor 21 it will be referred to as imaging data (image data), and this includes image signals, not only a signal that has been subjected to A/D conversion by the ADC 25, which will be described later.

Output of the image sensor 21 is connected to the A-AMP 23. The A-AMP 23 carries out analog gain adjustment for image signals that have been output from the image sensor 21. Output of the A-AMP 23 is connected to the ADC 25.

The ADC 25 is an analog-to-digital converter, and converts an image signal that has been subjected to analog gain adjustment by the A-AMP 23 to image data in a digital format (image data). This image data includes both data from normal pixels that are not for focus detection, and data from phase difference pixels that are for focus detection. As described previously, the ADC 25 may fulfill the function as a mixing section for mixing and outputting pixel values of same color pixels within a specified area. Output of the ADC 25 is output to the bus 35, and image data is temporarily stored in DRAM 37, which will be described later.

The imaging control circuit 26 carries out control of exposure start and readout of the image sensor 21 in accordance with control commands of the CPU 27. At the time of still picture shooting, at the time of live view display, and at the time of movie shooting, the imaging control circuit 26 changes readout control of the image sensor 21 in accordance with a drive mode. For example, the previously described mixing of pixel data is carried out. Specifically, at the time of live view display or movie shooting, not as many pixels are required compared to a still picture, but a greater number of frame images are acquired in one second, and so control is performed so as to mix pixel values using pixel addition.

The CPU 27 that is connected to the bus 35 carries out control of each section and each circuit, and overall control of the camera, in accordance with programs stored in the ROM 39, which will be described later. The CPU 27 functions as a crosstalk effect level estimating section, for estimating a crosstalk effect level for respective pixel values, from pixel values of pixels that are subject to the effects of crosstalk from the phase difference pixels, and pixel values of nearby pixels that are not subject to the effect of crosstalk from the phase difference pixels. With this embodiment, crosstalk difference amount is calculated as a crosstalk effect level, but the crosstalk effect level is not limited to crosstalk difference amount, and any value that corresponds to crosstalk effect level may be used. The crosstalk difference amount estimation will be described later using FIG. 2A-FIG. 2C.

The image processing section 29 is input with image data from the DRAM 37 by means of the bus 35, and carries out various image processing, generates image data for storage for a still image or movie, and temporarily stores this generated image data for storage in the DRAM 37. Also, image data for display is generated using image data for a movie that has been read out from the DRAM 37, and temporarily stored in the DRAM 37.

Also, the image processing section 29 carries out interpolation processing etc. for data of phase difference pixels, that are at pixel positions used for focus detection within the image sensor 21, using surrounding pixel data, and removes the effects of crosstalk. Specifically, the image processing section 29 functions as a correction processing section for correcting pixel values of pixels that have been affected by crosstalk from the phase difference pixels, based on a crosstalk effect level that has been estimated by the crosstalk effect level estimating section. With this embodiment, pixel values are corrected using crosstalk difference amount as crosstalk effect level. This crosstalk correction will be described later using equation (3), and S5 and S11 in FIG. 8.

The focus detection circuit 31 acquires data from phase difference pixels that has been temporarily stored in the DRAM 37, and calculates a defocus direction and defocus amount using well-known phase difference AF based on this data. Based on the defocus direction and defocus amount that have been calculated by the focus detection circuit 31, the CPU 27 carries out focusing of the photographing lens 11 using the drive section 17.

The video encoder 33 reads out image data for display that has been generated by the image processing section 29 and temporarily stored in the DRAM 37, and outputs to an LCD/TV 43. An LCD is a liquid crystal display, and is used at the time of live view display or playback display of already stored images on the rear surface of the camera etc. The TV is an external television set, and is used when playing back already stored images etc.

The DRAM 37 is an electrically rewritable memory, and, as described previously, performs temporary storage of image data, image data for storage, and image data for display etc. The DRAM 37 also performs temporary storage of various data for when the CPU 27 carries out camera control. It is also possible to use an SDRAM (synchronous dynamic random access memory) for temporary storage of image data. Crosstalk correction, which will be described later, is carried out using temporary stored image data.

The ROM 39 is a nonvolatile memory such as mask ROM or flash memory. As well as the previously described programs used by the CPU 27, various data such as camera adjustment values are also stored in the ROM 39. The flash memory 41 is built into the camera or is capable of being removed, and is a storage medium for image data storage.

Figure 2A:
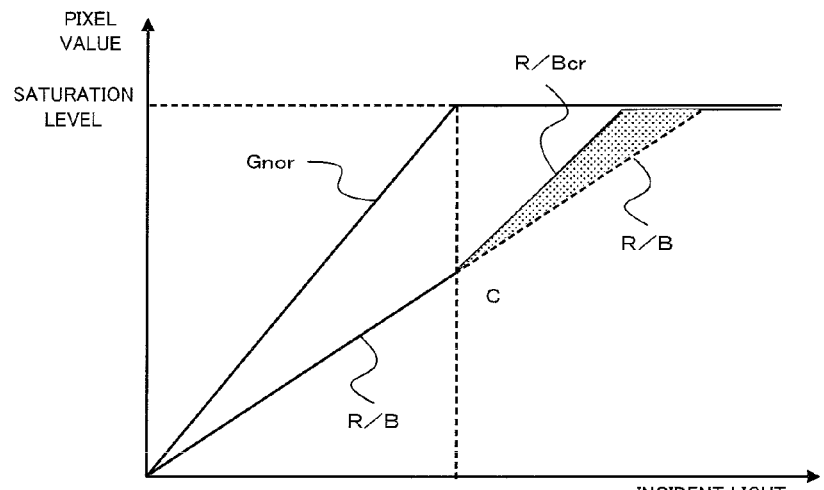
FIG. 2A-FIG. 2C are graphs for describing the occurrence of crosstalk in the camera of the one embodiment of the present invention.

Next, crosstalk in the image sensor 21 of the camera of this embodiment will be described using FIG. 2A-FIG. 2C. FIG. 2A shows variation in pixels values of G pixels within the normal pixels (Gnor) and R pixels or B pixels (referred to R/B) that are adjacent to the G pixels, with incident light amount. Pixel values that are proportional to incident light amount are output for both G pixels and R/B pixels up to an incident light amount I1. However, G pixels are highly sensitive compared to the R/B pixels, and so a saturated state for G pixels is reached at incident light amount I1.

In FIG. 2A, if light amount increases more than incident light amount I1, the G pixels (Gnor) will reach a saturated state and charge generated by the G pixels (Gnor) moves to the surrounding R/B pixels. As a result, at a C point pixel values of R/B pixels becomes R/Bcr. Specifically, a region enclosed by the line R/B shown by a dotted line and the line R/Bcr (a shaded region in the drawing) corresponds to amount of variation in pixel values due to crosstalk.

Figure 2B:
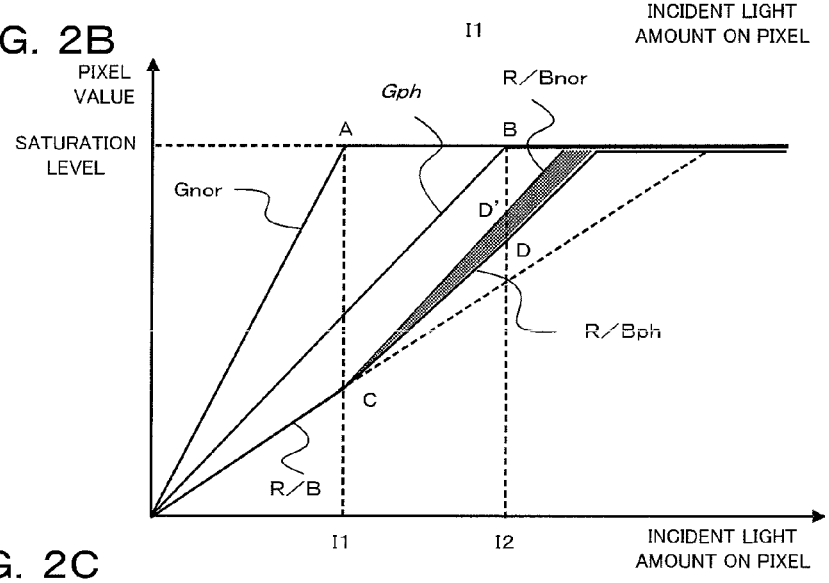

FIG. 2B shows variation in incident light amount and pixel value in a case where phase difference pixels (Gph) are arranged around the normal pixels (shown in italics in the drawing) in addition to the normal G pixels and R/B pixels. The phase difference pixels Gph (shown in italics in the drawing) have light shielding plates arranged so as to cover part of the pixels, in order to achieve phase difference detection. Therefore, the phase difference pixels have low sensitivity compared to the G pixels of the normal pixels, and even if the incident light amount for the normal pixels reaches the incident light amount I1 and the saturation level is reached, pixel values of the phase difference pixels Gph (shown in italics in the drawing) do not reach a saturation level, and a saturation level is reached if incident light amount I2 is reached.

Also, in FIG. 2B, line R/Bnor shows amount of variation due to crosstalk in the case where only normal pixels are adjacent around the R/B pixels, while a line R/Bph shows amount of variation due to crosstalk in the case where phase difference pixels are also adjacent around the R/B pixels. A region enclosed by the line R/Bnor and the line R/Bph (hatched region in the drawing) shows crosstalk difference amount. The dashed line extending along the line R/B shows pixel values for R/B pixels in the case where there is no crosstalk effect.

Figure 2C:
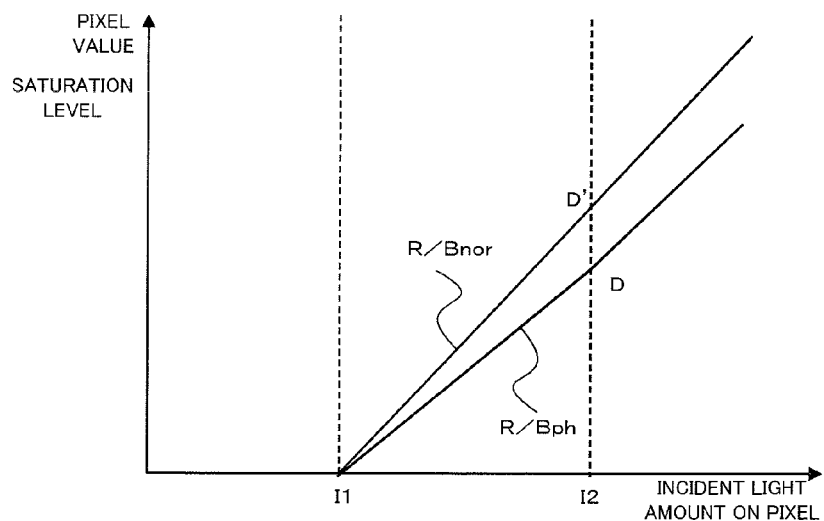

FIG. 2C is a drawing in which only crosstalk difference amount portions of FIG. 2B have been extracted. In the case where only normal pixels are adjacent around the R/B pixels, this corresponds to R/Bnor, as described previously, and crosstalk amount is high. In the case where there are phase difference pixels around the R/B pixels, this corresponds to R/Bph and crosstalk amount is low. For incident light amount I2, a pixel value for R/Bnor is D', and a pixel value for R/Bph is D.

Figure 3:
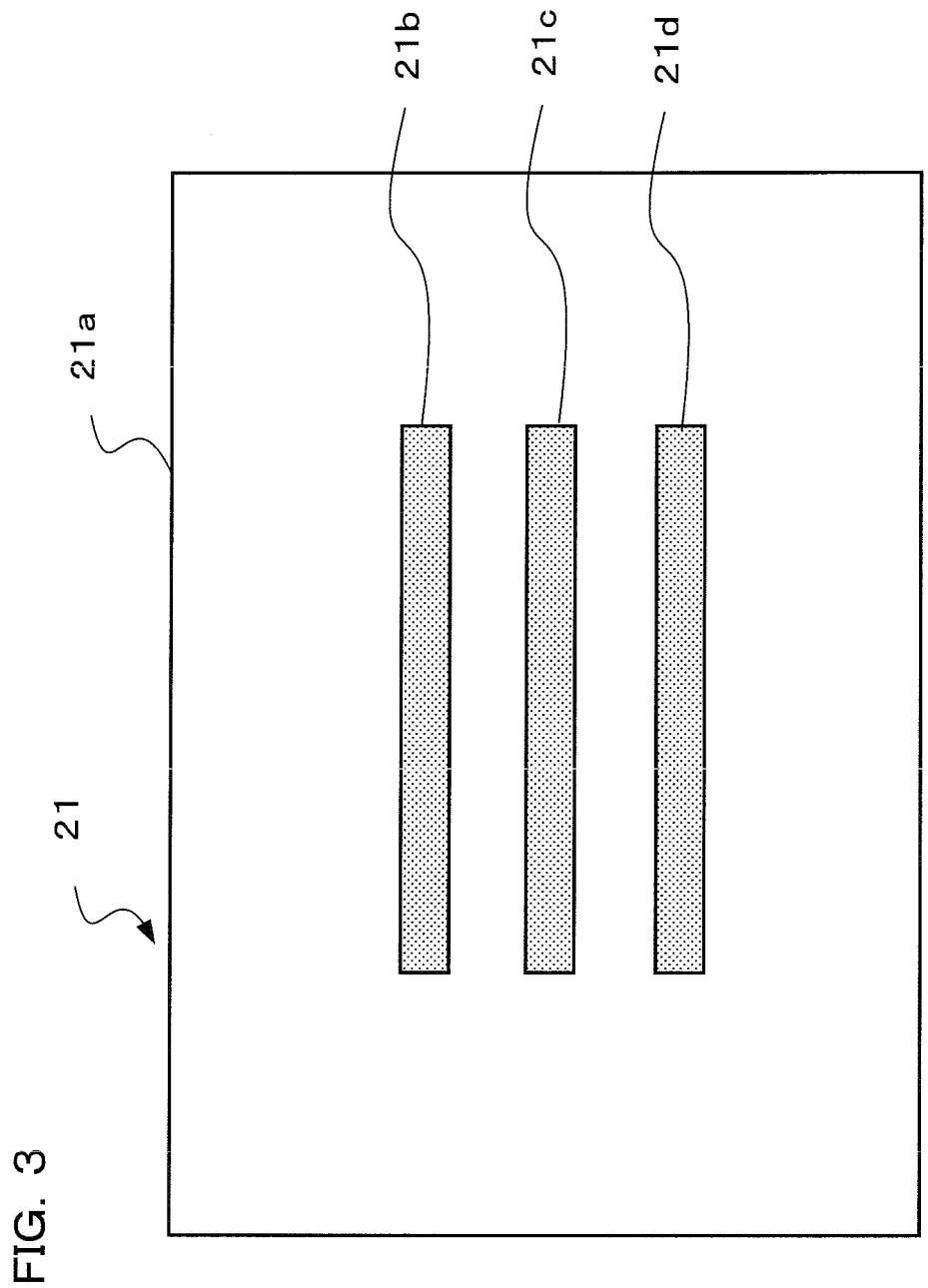
FIG. 3 is a drawing showing an arrangement region for phase difference pixels, for an image sensor of the camera of the one embodiment of the present invention.

Next, an arrangement region for phase difference pixels Gph (or Gb) will be described using FIG. 3. As described previously, normal pixels made up of G pixels, R pixels, and B pixels, and phase difference pixels Gph (or Gb) replaced at positions of the G pixels, are arrayed on the imaging surface of the image sensor 21. Among these pixels, the normal pixels are arranged over the entire surface of an effective pixel region 21a of the image sensor 21, but the phase difference pixels Gph (or Gb) are only arranged within regions 21b-21d, as shown in FIG. 3. Besides the arrangement of lateral regions as shown in FIG. 3, the arrangement of the phase difference pixels Gph (or Gb) may be appropriately determined in accordance with arrangement of ranging areas, such as small rectangular or circular regions arranged in a matrix shape.

Next, an arrangement for phase difference pixels within the regions 21b-21d, and the effects of crosstalk on nearby pixels, will be described using FIG. 4. In FIG. 4, Gr and Gb represent G pixels on the same line as respective R pixels or B pixels. These R, Gr, Gb and B pixels are pixels for imaging.

Also, in FIG. 4 Gb shown in italics are phase difference pixels and are arranged at positions of Gb pixels, with either the left or right being opened and light flux of either the left side or right side being incident on a G pixel. With the example shown in FIG. 4, the phase difference pixels are arranged at positions (x3, y3), (x7, y3), (x11, y3), (x3, y7), (x7, y7), (x11, y7), . . . . Arrangement of the phase difference pixels has been described with either the left or right being open, but is also possible to have either the top or the bottom open, or to be open in an inclined direction etc., and the arrangement can also be suitably changed from that shown in FIG. 4.

Also, in FIG. 4 B pixels and R pixels that are shown underlined are pixels that are affected by crosstalk from the phase difference pixels Gb (shown in italics in the drawing). With the example shown in FIG. 4, these are R pixels (x3, y2) and (x3, y4) and B pixels (x2, y3) and (x4, y3) etc, around phase difference pixels Gb (x3, y3) (Gb are shown in italics in the drawings).

Next, pixel addition for movies and propagation of crosstalk due to pixel addition will be described using FIG. 5A and FIG. 5B. At the time of movie shooting and at the time of live view display, storage of display and image data is carried out using data obtained by adding same color pixels. This addition processing gives R' pixels shown in FIG. 5B by adding pixels R1-R4 shown in FIG. 5A (corresponding to (x3, y2), (x5, y2), (x3, y4) and (x5, y4) in FIG. 4). Similarly, the addition processing also gives Gr' pixels shown in FIG. 5B by adding pixels Gr1-Gr4 (corresponding to (x4, y2), (x6, y2), (x4, y4) and (x6, y4) in FIG. 4).

Figures 5A, 5B:
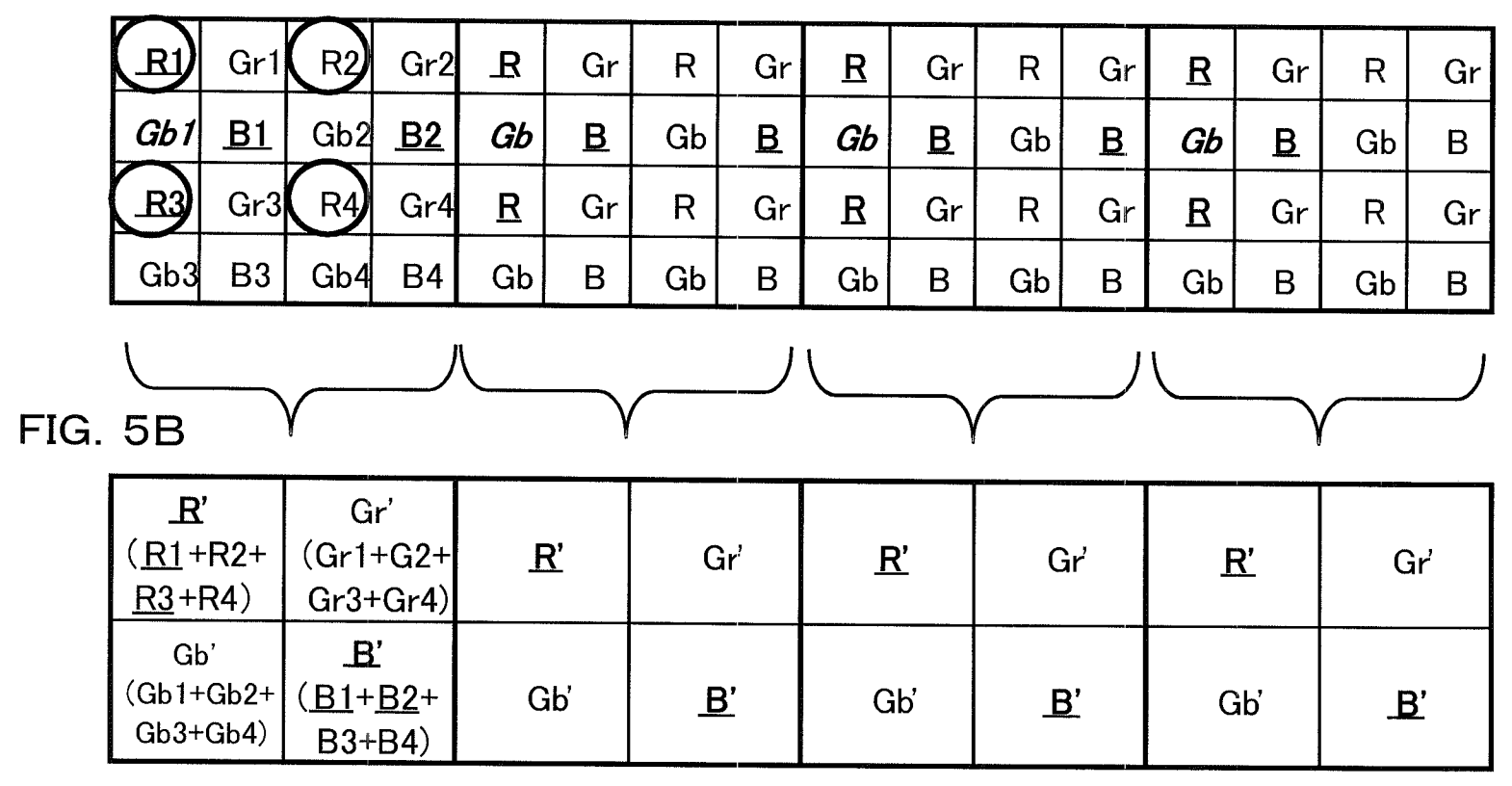

Also, Gb1-Gb4 pixels (corresponding to (x3, y3), (x5, y3), (x3, y5) and (x5, y5) in FIG. 4) are added to give the Gb' pixels shown in FIG. 5B. Similarly, B1-B4 pixels (corresponding to (x4, y3), (x6, y3), (x4, y5) and (x6, y5) in FIG. 4) are added to give the B' pixels shown in FIG. 5B.

Addition processing for same color pixels may be performed with analog processing within the image sensor 21, as described previously, and may also be analog addition processing or digital addition processing carried out after read out from the image sensor 21. Also, with this embodiment, a single pixel is derived by performing addition processing for 4 pixels of the same color (2×2 pixels), but this is not limiting, and the number of pixels to be added can be appropriately changed.

In this way, if pixel addition processing for a movie is carried out, the effect of crosstalk is propagated. For example, among the R1-R2 pixels the R1 pixel and the R3 pixel are affected by crosstalk, and as a result the R' pixel that is derived by addition processing of the R1-R4 pixels is affected by crosstalk. Similarly the B' pixel that is derived by addition processing of the B1-B4 pixels is also affected by crosstalk.

Figure 6:
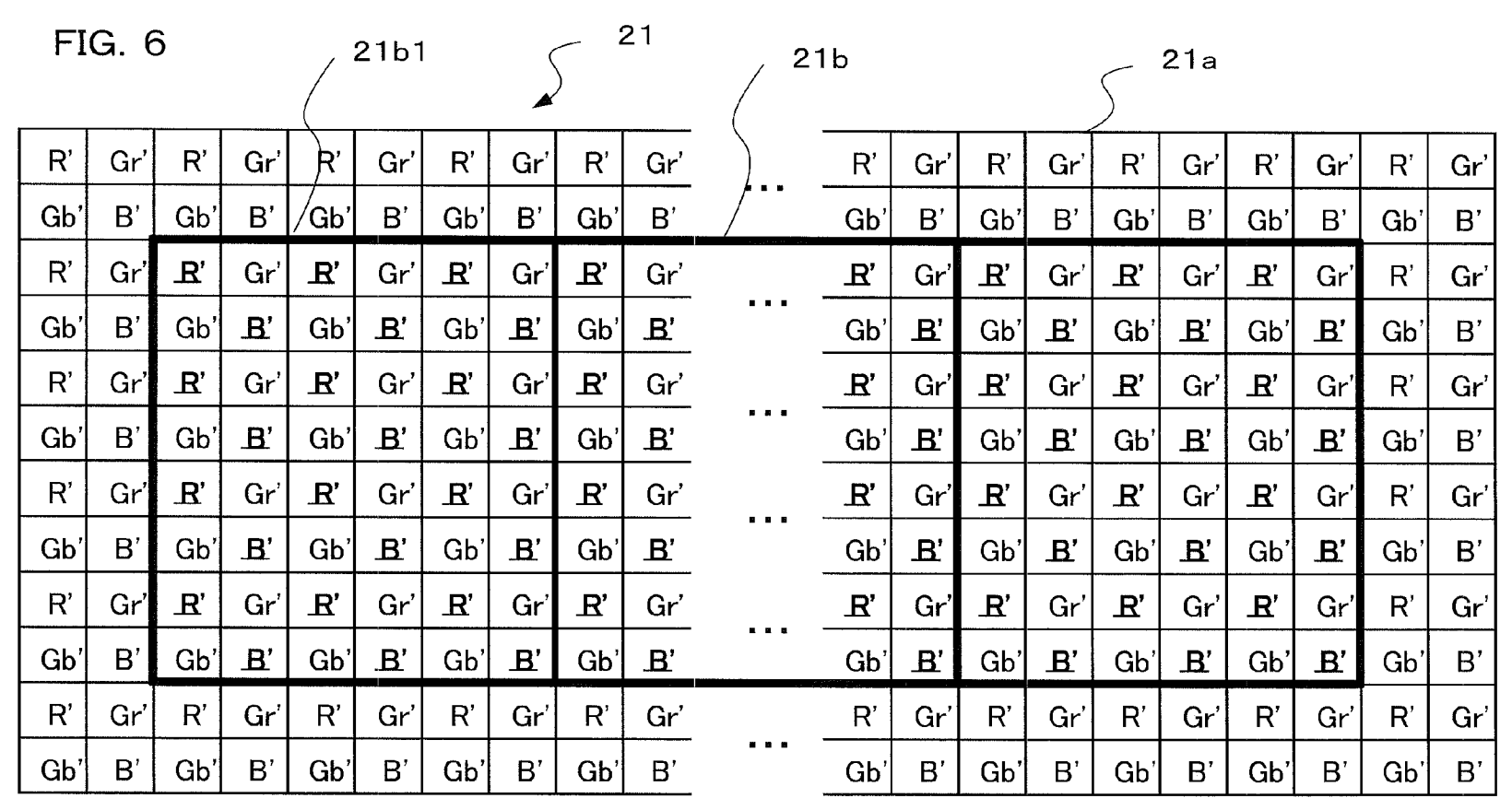

FIG. 6 shows arrangement of addition R1 pixels, addition B' pixels, addition Gr' pixels, and addition Gb' pixels within the effective pixel region 21a after the addition processing shown in FIG. 5A and FIG. 5B. The region 21b shown by the bold line is divided into a plurality of integration areas 21b1. . . . Also, phase difference pixels exist within the region 21b while phase difference pixels do not exist outside this region. As was described using FIG. 5A and FIG. 5B, in regions 21b-21d where the phase difference pixels exist, crosstalk due to the phase difference pixels is propagated by addition processing. Accordingly, the effect of crosstalk is significant within the regions 21b-21d. On the other hand, as was explained with FIG. 2A-FIG. 2C, the extent of the effect of crosstalk is different between around the phase difference pixels and away from the phase difference pixels, and so the effect of crosstalk within the regions 21b-21d is small compared to outside those regions. This means that color will differ between the regions 21b-21d, where there are phase difference pixels, and outside those regions.

With this embodiment, therefore, addition pixel values (addition R' value, addition B' value) for regions in which phase difference pixels exist are subjected to correction calculation processing using addition pixel values (addition R' value, addition B' value) for regions where the phase difference pixels do not exist. With correction calculation processing, calculation of correction coefficients is carried out in units of integration area, and correction processing is carried out for every addition pixel. An integration area is a unit of 6×8 addition pixels in the example shown in FIG. 6 (a range enclosed by a borderline frame in the drawing), but this is not limited and the number of addition pixels can be appropriately changed.

Figure 7:
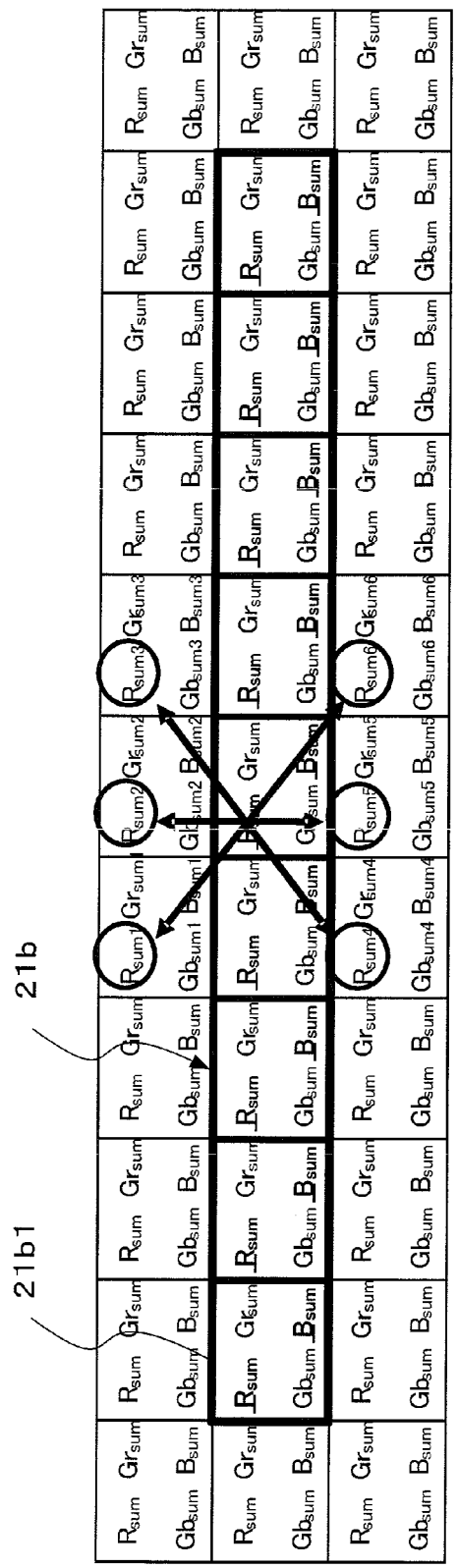
FIG. 7 is a drawing showing pixel integration data for crosstalk estimation, for the image sensor of the one embodiment of the present invention.

As shown in FIG. 7, the correction calculation processing calculates correction coefficients using an integrated value Rsum for addition R' values that are affected by crosstalk from the phase difference pixels and integrated values Rsum–Rsum6 for addition R' values that are not affected by crosstalk from the phase difference pixels, and corrects addition R' values within the integration area using the calculated correction coefficients. Also, similarly, correction coefficients are calculated using an integrated value Bsum of addition B' values that are affected by crosstalk from the phase difference pixels and integrated values Bsum1–Bsum6 of addition B' values that are not affected by crosstalk from the phase difference pixels, and corrects addition B' values within the integration area using the calculated correction coefficients. The integrated value Rsum is a sum of addition R' values within the integration area, and the integrated value Bsum is a sum of addition B' values within the integration area.

This crosstalk correction processing will be described using the flowchart shown in FIG. 8. This flowchart is executed by the CPU 27 controlling the image processing section 29 and DRAM 37 etc. in accordance with programs stored in the ROM 39.

If the flow for crosstalk correction processing is entered, first an expected value for Rsum in question is calculated (S1). Here, an expected value of Rsum is calculated using six values of Rsum that are close to Rsum that is the object of correction. Specifically, combinations of integrated values that are adjacent to the integrated value Rsum, and are at positions that are symmetrical with respect to Rsum, namely, absolute values (|Rsum1−Rsum6|, |Rsum2−Rsum5| and |Rsum3−Rsum4|) of differences between Rsum 1 and Rsum 6, Rsum 2 and Rsum 5, and Rsum 3 and Rsum 4, are calculated, the smallest Rsum combination is detected, and an average value of this smallest combination is made the expected value of Rsum. For example, in the event that the smallest combination is Rsum1 and Rsum6, the expected value for Rsum is calculated using (1) below.

$$R\text{sum expected value} = \text{Average}(R\text{sum1} + R\text{sum6}) \quad (1)$$

Once the expected value for Rsum has been calculated, next a crosstalk correction coefficient ΔVc is calculated (S3). The crosstalk correction coefficient is calculated from a ratio of the expected value for Rsum that was calculated in step S1, and Rsum that is the subject of correction. Specifically, the crosstalk correction coefficient ΔVc is calculated from equation (2) below. This crosstalk correction coefficient ΔVc corresponds to a crosstalk difference amount, and is calculated by the CPU 27.

$$\Delta Vc = R\text{sum expected value}/R\text{sum} \quad (2)$$

Once the crosstalk correction coefficient has been calculated, next the R pixel is corrected with the crosstalk correction coefficient (S5). Here, R pixels (addition R' values) within the same integration area (regions 21b-21d) are corrected with the same crosstalk correction coefficient ΔVc. Specifically, the R pixel value after correction is calculated using equation (3) below. By multiplying the R pixel value by this crosstalk correction coefficient ΔVc, it is possible to carry out correction of pixel values that have been affected by crosstalk. This multiplication processing is carried out for individual pixels by the image processing section 29.

$$R'(\text{after correction}) = R'(\text{before correction}) \times \Delta Vc \quad (3)$$

Once the R' pixel has been corrected with the crosstalk correction coefficient, the above described processing of steps S1-S5 is next carried out for the B' pixels (S7-S11). Here, the same processing as in steps S1-S5 is carried out with Rsum simply replaced with Bsum, and so detailed description is omitted.

Once the B pixels have been corrected with the crosstalk correction coefficient in step S11, it is next determined whether or not correction processing has been completed for all integration areas (S13). Crosstalk correction is performed in units of integration area by calculating a crosstalk correction coefficient (range enclosed with the bold line in FIG. 6), and then correcting addition R' values and addition B' values using this crosstalk correction coefficient. In this step it is determined whether or not the correction processing has been completed for all integration areas.

If the result of determination in step S13 is that correction processing has not been completed for all integration areas, the next integration area is set, processing returns to step S1, and the above described correction processing is repeated. On the other hand, if correction processing has been completed for all of the integration areas, crosstalk correction processing is completed.

Figure 8:
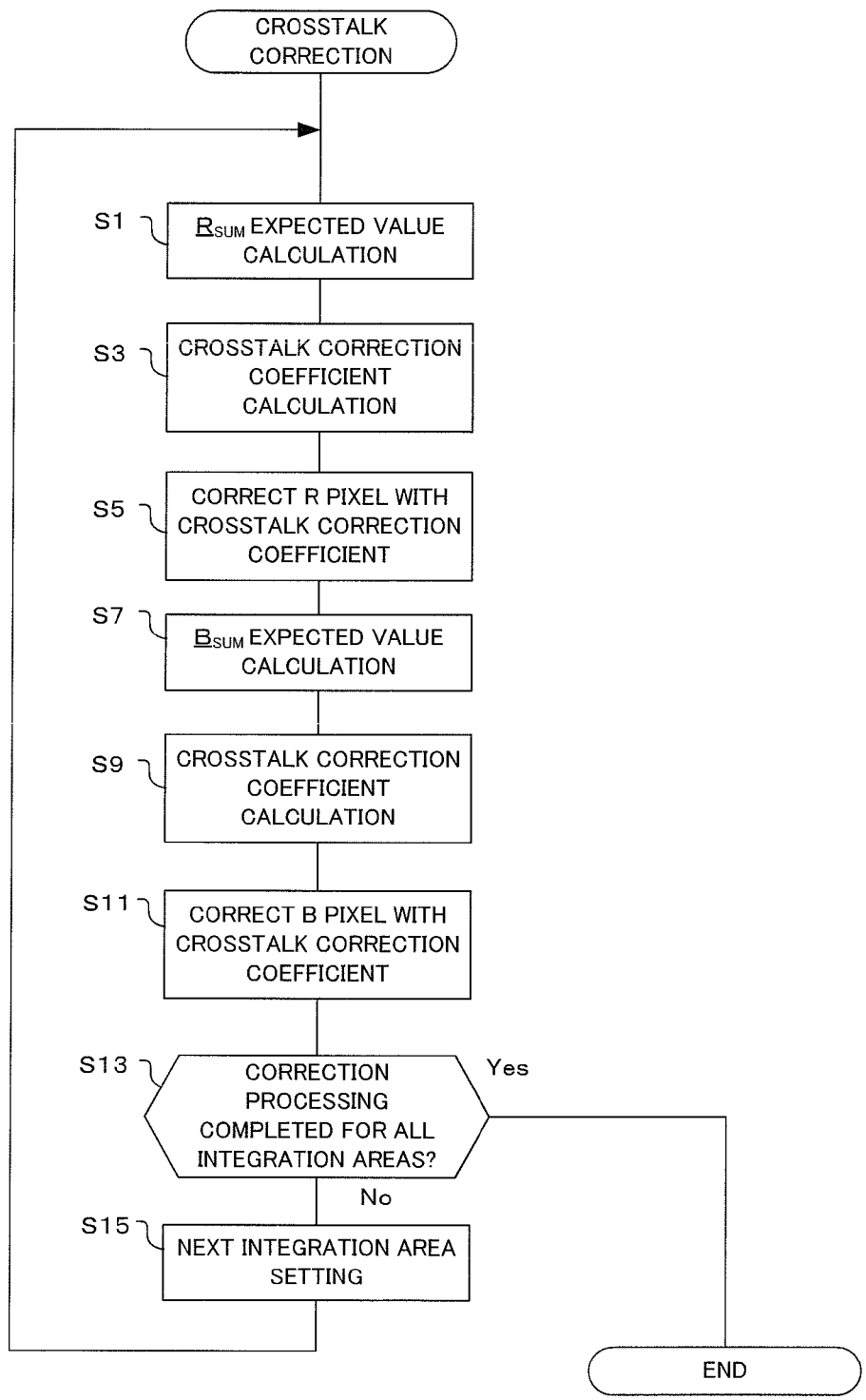
FIG. 8 is a flowchart showing a crosstalk correction operation in the camera of one embodiment of the present invention.

As has been described above, in the one embodiment of the present invention the image sensor 21 has phase difference pixels for focus detection (for example Gb in FIG. 5A (shown in italics in the drawing)) arranged at positions of some of the imaging pixels, with crosstalk effect level for respective pixel values (for example, a difference between D and D' in FIG. 2B (or a difference amount between R/Bnor and R/Bph), S3 and S9 in FIG. 8, executed in the image processing section 29) being estimated from pixel values of pixels that are affected by crosstalk from the phase difference pixels (for example, R, B in FIG. 5A and Rsum, Bsum in FIG. 7) and pixel values of same color pixels (for example Rsum, Bsum in FIG. 7) that neighbor the crosstalk affected pixels and are not affected by crosstalk from the phase difference pixels, and pixel values of pixels that have been affected by crosstalk from the phase difference pixels being corrected based on the estimated crosstalk effect level (for example, S5 and S11 in FIG. 8). By correcting crosstalk of the phase difference pixels, it is possible to reduce differences in color between regions where normal pixels are arranged and regions where phase difference pixels are arranged.

Also, with the one embodiment of the present invention, a mixing section (for example, the image sensor 21 or ADC 25) is provided for, in the event that pixels that have been affected by crosstalk from the phase difference pixels exist nearby, mixing pixel values for a plurality of same color pixels, including pixels that are arranged within a specified region and have been affected by crosstalk from the phase difference pixels (refer to FIG. 5A and FIG. 5B). Estimation of the crosstalk effect level is estimation of crosstalk effect level from output pixel values of the mixing section and pixel values of neighboring pixels that are not affected by crosstalk (refer to FIG. 7 and FIG. 8). As a result, it is possible to reduce image degradation due to crosstalk even in a case where there are regions in which phase difference pixels are densely arranged and regions in which few if any phase difference pixels are arranged.

Also, with the one embodiment of the present pixel values input to the mixing section are mixed with pixel values of a plurality of same color pixels within the image sensor 21. This means that for images that have been acquired in a pixel mixing mode for movies or live view, it is possible to prevent image degradation due to crosstalk.

Also, the one embodiment of the present invention is provided with a first mixing section for mixing pixel values of a plurality of same color pixels, that are arranged within a first region of the image sensor 21 and that include pixels that have been affected by crosstalk from phase difference pixels (for example, the ADC 25 for mixing pixels of the region 21b in FIG. 7, or the image processing section 29), a second mixing section for mixing only pixel values of a plurality of same color pixels that are arranged in a second region of the image sensor 21 and are not affected by crosstalk from the phase difference pixels (the ADC 25 for mixing pixels outside the region 21b of FIG. 7, or the image processing section 29), a crosstalk effect level estimating section for estimating crosstalk effect level between mixed pixel values of the first region and mixed pixel values of the second region from respective mixed pixel values (for example, differences between D and D' in FIG. 2B (or difference amounts between R/Bnor and R/Bph), S3 and S9 in FIG. 8 executed in the image processing section 29), and a correction processing section for correcting pixel values of pixels that have been affected by crosstalk from the phase difference pixels within the first region in accordance with the crosstalk effect level that have been estimated by the crosstalk effect level estimating section (for example S5 and S11 in FIG. 8 executed by the CPU 27). As a result, it is possible to reduce image degradation due to crosstalk even in a case where there are a first region in which phase difference pixels are densely arranged and a second region in which few if any phase difference pixels are arranged.

Also, with the one embodiment of the present invention region setting is performed so that the first region (for example inside the region 21b of FIG. 7) is adjacent to at least one or more second regions (for example outside the region 21b in FIG. 7). It is therefore possible to estimate crosstalk amount with good accuracy, and it is possible to reduce image degradation.

Also, with the one embodiment of the present invention, the correction processing section (for example, S5 and S11 in FIG. 8 executed by the CPU 27) applies the same correction to pixel values of all pixels that are the subject of correction, in accordance with estimated crosstalk effect level (for example, the same crosstalk correction coefficient ΔVc is used within the same integration area). Since correction is carried out for all pixels that are the subject of correction, it is possible to reduce image degradation of the image overall.

With the one embodiment of the invention, as was described using FIG. 7, pixel values from the image sensor are mixed and crosstalk correction was carried out for the mixed pixel value. However, this is not limiting, and it is possible to carry out crosstalk correction for each pixel without mixing. In the case where an image changes at high speed, such as with live view or movie recording, by mixing pixel values it is possible to carry out crosstalk correction rapidly. On the other hand, by carrying out crosstalk for every pixel without mixing, it is possible to obtain a high-quality image for a large number of pixels such as with a still image.

Also, with the one embodiment of the present invention in carrying out crosstalk correction calculation, crosstalk correction coefficients were obtained from a ratio of Rsum expected value and Rsum, as shown in equation (2). However, this is not limiting, and it is also possible to carry out crosstalk correction calculations based on difference values between D and D' in FIG. 2B, namely difference values between R/B pixel values that have been affected by normal pixel crosstalk and R/B pixel values that have been affected by phase difference pixel crosstalk, etc.

Further, with the one embodiment of the present invention, a device for carrying out image processing has been described using a digital camera, but as a camera it is also possible to use a digital single lens reflex camera, a mirrorless camera or a compact digital camera, or a camera for movie use such as a video camera, and further to have a camera that is incorporated into a mobile phone, a smartphone, a mobile information terminal (PDA: Personal Digital Assistant), game console etc. The present invention can be applied to any device that uses an image sensor in which phase difference pixels for focus detection are arranged at positions of some of the image in pixels.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing device comprising:
   an image sensor having phase difference detection pixels for focus detection arranged at positions of some imaging pixels;
   a first mixing section, arranged within a first region of the image sensor, for mixing pixel values of a plurality of same color pixels including pixels that have been affected by crosstalk from the phase difference detection pixels;
   a second mixing section, arranged within a second region of the image sensor, for mixing pixel values of a plurality of same color pixels that have not been affected by crosstalk from the phase difference detection pixels;
   a crosstalk effect level estimating section for estimating crosstalk effect level of mixed pixel values within the first region and mixed pixel values within the second region, from the respective mixed pixel values; and
   a correction processing section for correcting pixel values of pixels that have been affected by crosstalk from the phase difference detection pixels within the first region in accordance with the crosstalk effect level that has been estimated by the crosstalk effect level estimating section.

2. The image processing device of claim 1, wherein the first region is set so as to be adjacent to at least one or more second regions.

3. The image processing device of claim 2 wherein, pixel values input to the first mixing section and second mixing section are mixed with pixel values of a plurality of same color pixels within the image sensor.

4. The image processing device of claim 1 wherein, the correction processing section applies the same processing to all pixels that are the subject of correction, in accordance with crosstalk effect level that has been estimated by the crosstalk effect level estimating section.

5. An image processing method, for an image processing device having an image sensor with phase difference detection pixels for focus detection arranged at positions of some imaging pixels, comprising:
   a step of mixing pixel values of a plurality of same color pixels, arranged within a first region of the image sensor, including pixels that have been affected by cross talk from the phase difference detection pixels;
   a step of mixing pixel values of a plurality of same color pixels, arranged within a second region of the image sensor, that have not been affected by cross talk from the phase difference detection pixels;
   a step of estimating crosstalk effect level of mixed pixel values within the first region and mixed pixel values within the second region, from the respective mixed pixel values; and
   a step of correcting pixel values of pixels that have been affected by crosstalk from the phase difference detection pixels within the first region in accordance with the cross talk effect level that has been estimated in the step of estimating crosstalk effect level.

6. A non-transitory computer-readable medium storing a computer program, for an image processing device, this image processing device having an image sensor with phase difference detection pixels for focus detection arranged at positions of some imaging pixels, the program comprising:
   a step of mixing pixel values of a plurality of same color pixels, arranged within a first region of the image sensor, including pixels that have been affected by cross talk from the phase difference detection pixels;
   a step of mixing pixel values of a plurality of same color pixels, arranged within a second region of the image sensor, that have not been affected by cross talk from the phase difference detection pixels;
   a step of estimating crosstalk effect level of mixed pixel values within the first region and mixed pixel values within the second region, from the respective mixed pixel values; and
   a step of correcting pixel values of pixels that have been affected by crosstalk from the phase difference detection pixels within the first region in accordance with the cross talk effect level that has been estimated in the step of estimating crosstalk effect level.

* * * * *